_(12)_ United States Patent
Cabodi et al.

(10) Patent No.: US 11,111,183 B2
(45) Date of Patent: Sep. 7, 2021

(54) UNSHAPED PRODUCT FOR REPAIRING GLASS MELTING FURNACES

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Thierry Consales, Pernes les Fontaines (FR); Michel Gaubil, Les Angles (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 110 days.

(21) Appl. No.: 15/556,438

(22) PCT Filed: Mar. 7, 2016

(86) PCT No.: PCT/EP2016/054827
§ 371 (c)(1),
(2) Date: Sep. 7, 2017

(87) PCT Pub. No.: WO2016/142353
PCT Pub. Date: Sep. 15, 2016

(65) Prior Publication Data
US 2018/0237344 A1  Aug. 23, 2018

(30) Foreign Application Priority Data

Mar. 9, 2015 (FR) .................................. 1551936
Mar. 9, 2015 (FR) .................................. 1551940

(51) Int. Cl.
| | | |
|---|---|---|
| *C04B 35/482* | (2006.01) |
| *C04B 35/48* | (2006.01) |
| *C04B 35/106* | (2006.01) |
| *C04B 35/14* | (2006.01) |
| *C03B 5/43* | (2006.01) |
| *C04B 35/12* | (2006.01) |
| *C04B 35/632* | (2006.01) |
| *C04B 35/01* | (2006.01) |
| *C04B 35/101* | (2006.01) |
| *C04B 35/634* | (2006.01) |
| *F27D 1/16* | (2006.01) |
| *C04B 35/76* | (2006.01) |

(Continued)

(52) U.S. Cl.
CPC .............. *C04B 35/482* (2013.01); *C03B 5/43* (2013.01); *C04B 35/01* (2013.01); *C04B 35/101* (2013.01); *C04B 35/106* (2013.01); *C04B 35/12* (2013.01); *C04B 35/14* (2013.01); *C04B 35/481* (2013.01); *C04B 35/632* (2013.01); *C04B 35/634* (2013.01); *C04B 35/66* (2013.01); *C04B 35/76* (2013.01); *F27D 1/10* (2013.01); *F27D 1/16* (2013.01); *C04B 2235/3201* (2013.01); *C04B 2235/3203* (2013.01); *C04B 2235/3206* (2013.01); *C04B 2235/3208* (2013.01); *C04B 2235/3231* (2013.01); *C04B 2235/3232* (2013.01); *C04B 2235/3272* (2013.01); *C04B 2235/36* (2013.01); *F27D 2001/161* (2013.01)

(58) Field of Classification Search
CPC ..... C04B 35/482; C04B 35/01; C04B 35/101; C04B 35/106; C04B 35/12; C04B 35/14; C04B 35/481; C04B 35/632; C04B 35/634; C04B 35/66; C04B 35/76; C04B 2235/3201; C04B 2235/3203; C04B 2235/3206; C04B 2235/3208; C04B 2235/3231; C04B 2235/3232; C04B 2235/3272; C04B 2235/36; C03B 5/43; F27D 1/10; F27D 1/16; F27D 2001/161
See application file for complete search history.

(56) References Cited

U.S. PATENT DOCUMENTS 4,075,363 A * 2/1978 Shank, Jr. ................. B44C 1/04
427/148
5,589,426 A * 12/1996 Iwasaki ..................... C03C 3/17
501/127

(Continued)

FOREIGN PATENT DOCUMENTS

| | | |
|---|---|---|
| EP | 0739861 B1 | 7/2001 |
| EP | 1443029 A1 | 8/2004 |
| WO | 2011077411 A1 | 6/2011 |

OTHER PUBLICATIONS

Corresponding International application, application No. PCT/EP2016/054827, International Search Report dated May 30, 3 pages.

*Primary Examiner* — Queenie S Dehghan
(74) *Attorney, Agent, or Firm* — Cooper Legal Group, LLC; Ronald M. Kachmarik

(57) ABSTRACT

An unshaped product including, as weight percentages, A) particles (a) of at least one refractory material other than a glass and a glass-ceramic, and the main constituent(s) of which are alumina and/or zirconia and/or silica and/or chromium oxide: B) 2% to 15% of particles (b) of a hot binder chosen from glass-ceramic particles, particles made of a glass, and the mixtures of these particles, a glass being a noncrystalline material exhibiting a glass transition temperature of less than 1100° C., the hot binder not being in the solid state at 1500° C., C) less than 2% of particles (c) of hydraulic cement, D) less than 7% of other constituents, the particles (a) and (b) being distributed, as weight percentages in the following way: fraction<0.5 µm: ≥1%, fraction<2 µm: ≥4%, fraction<10 µm: ≥13%, fraction<40 µm: 25%-52%.

33 Claims, No Drawings

(51) Int. Cl.
    *F27D 1/10*     (2006.01)
    *C04B 35/66*     (2006.01)

(56) References Cited

U.S. PATENT DOCUMENTS

| | | | |
|---|---|---|---|
| 6,372,288 B1 * | 4/2002 | Meynckens | C03B 5/43 427/140 |
| 8,455,380 B2 * | 6/2013 | Gonsales | C03B 5/43 106/802 |
| 2004/0266604 A1 * | 12/2004 | Guigonis | C03B 5/43 501/105 |
| 2012/0309608 A1 | 12/2012 | Francy et al. | |
| 2014/0291904 A1 * | 10/2014 | Soudier | C04B 35/63404 266/280 |

* cited by examiner

UNSHAPED PRODUCT FOR REPAIRING GLASS MELTING FURNACES

TECHNICAL FIELD

The present invention relates to an unshaped product intended in particular for the repair of a bottom of a glass melting furnace. The invention also relates to a process for glass melting furnace repair comprising a stage of employing said unshaped product, and also to a glass melting furnace comprising at least one part obtained from said unshaped product.

STATE OF THE ART

The glass industry generally uses, for the construction of its furnaces, fused and cast refractory products, or products obtained by sintering, which are highly resistant to corrosion by glass and which are provided in the form of blocks or slabs.

Molten glass is highly corrosive and refractory products, in particular those constituting the melting tank, in particular the bottom of said tank, experience significant wear which may result in the creation of leakages of molten glass. These leakages are dangerous and may result in the furnace being shut down.

In order to increase the lifetime of the furnace, the glass manufacturer may be driven to carry out repairs.

EP 0 739 861 B1 describes a product for repairing glass melting furnaces. This product exhibits a poor hot flowability. For any repair, the furnace has to be cooled, which substantially increases the time necessary for the repair.

Furthermore, this product requires a consolidation sintering at a high temperature, for a long period of time. For this reason also, this product does not make possible rapid repairing.

EP 2 358 650 describes a self-flow concrete (that is to say, comprising cement) which may be used in the manufacture of a glass furnace bottom. The particles with a size of less than 40 μm may be distributed, as percentages by weight with respect to the weight of the unshaped concrete, in the following way:
fraction<0.5 μm: ≥4%,
fraction<2 μm: ≥5%,
fraction<10 μm: ≥19%,
fraction<40 μm: 34%-52%,
fraction of between 2 μm and 40 μm: 26.5%-34%.

Like the product from EP 0 739 861, this unshaped concrete is not, however, suitable for a hot application.

Furthermore, unshaped products are used during the repair of furnaces for the preparation of metals. The mechanical stresses in this application are, however, very different from those encountered in the application to glass furnaces. The conditions for corrosion of the furnaces by a molten glass or by a molten metal are also different. Finally, some impurities, tolerated in furnaces for the preparation of metals, are unacceptable in the manufacture of glass. In particular, the refractory materials used in glass furnaces must not generate the release of stones by fragmentation nor produce bubbles. An unshaped product intended for a furnace for the preparation of metals is thus not, a priori, able to be used in a glass furnace, in particular in a zone in contact with the glass.

There exists a need for an unshaped product capable of forming, after addition of water, a wet mixture suitable for rapid repairing of a region of a glass melting furnace.

The present invention is targeted at meeting this need, at least partially.

SUMMARY OF THE INVENTION

The invention provides an unshaped product, intended in particular for the preparation of a bottom of a glass furnace, comprising, as percentages by weight and for a total of 100%,
A) particles (a) of at least one refractory material other than a glass and a glass-ceramic, and the main constituent(s) of which are alumina ($Al_2O_3$) and/or zirconia ($ZrO_2$) and/or silica ($SiO_2$) and/or chromium oxide ($Cr_2O_3$), the particles (a) constituting the remainder to 100%,
B) 2% to 15% of particles (b) of a hot binder chosen from glass-ceramic particles, particles made of a glass, in particular made of a glass-ceramic precursor glass, and the mixtures of these particles, the hot binder not being in the solid state at 1500° C., that is to say the hot binder being chosen so that its glassy phase exhibits a glass transition temperature of less than or equal to 1500° C.,
C) less than 2% of particles (c) of hydraulic cement,
D) less than 7% of other constituents (d),
the combined said particles (a) and (b), preferably the combined particles of the unshaped product, being distributed, as percentages by weight with respect to the weight of the unshaped product, in the following way:
fraction<0.5 μm: ≥1%,
fraction<2 μm: ≥4%,
fraction<10 μm: ≥13%,
fraction<40 μm: 25%-52%.

As will be seen in more detail in the continuation of the description, a wet mixture, obtained after addition of water to the unshaped product according to the invention:
is pumpable with suction pressures of less than or equal to 180 bar,
is "self-flowable" under hot conditions,
does not result in a harmful segregation and thus, after low-temperature sintering, results in a shaped product which exhibits a good crushing strength.

An unshaped product according to the invention is thus perfectly capable of being used for the repair of a glass melting furnace, in particular for a repair of a bottom of such a furnace.

In a first main embodiment, the combined particles (b) comprise, indeed even consist of, glass particles.

In a second main embodiment, the combined particles (b) comprise, indeed even consist of, glass-ceramic particles and/or of particles of glass-ceramic precursor glass.

Preferably, the amount by weight of glass-ceramic particles and/or of particles of glass-ceramic precursor glass in the combined particles (b) is greater than 10%, preferably greater than 20%, preferably greater than 30%, preferably greater than 50%, preferably greater than 70%, indeed even greater than 90%, indeed even greater than 95%, indeed even substantially equal to 100%, on the basis of the weight of the combined particles (b). Advantageously, the resistance to corrosion and the thermomechanical properties of the shaped product are thereby improved.

Preferably, the combined particles (b) are composed of glass particles and comprise particles of glass-ceramic precursor glass. Preferably again, the combined particles (b) consist of particles of glass-ceramic precursor glass.

An unshaped product according to the invention may also comprise one or more of the following optional characteristics:

The particles (a) and (b), preferably the combined particles of the unshaped product, are distributed in the following way, as percentages by weight:
  fraction<0.5 µm: ≤7%, preferably ≥6%, preferably ≥5%, and/or indeed even≥2%, and/or
  fraction<2 µm: ≥5%, preferably ≥6%, preferably ≥7% and/or preferably ≤18%, preferably ≤16%, preferably ≥14%, preferably ≥12%, and/or
  fraction<10 µm: ≥16%, preferably ≥19%, preferably ≥20% and/or preferably ≤40%, preferably ≥35%, preferably ≥33%, preferably ≤30%, preferably ≤28%, and/or
  fraction<40 µm: ≥27%, preferably ≥29%, preferably ≥30%, preferably ≥33%, preferably ≥35%, preferably ≥37% and/or preferably ≤50%, preferably ≤47%, preferably ≤45%, preferably ≤42%, and/or
  fraction of between 2 µm and 40 µm: ≥16% and/or ≤40%.
The maximum size of the combined particles (a) and (b), preferably the maximum size of the combined particles of the unshaped product, is less than or equal to 2.5 mm, preferably less than or equal to 2 mm, indeed even less than or equal to 1.5 mm.
The combined particles (a) and (b) with a size of less than 500 µm, preferably the combined particles of the unshaped product with a size of less than 500 µm, represent more than 50%, preferably more than 55%, preferably more than 60%, preferably more than 65%, indeed even more than 70%, of the weight of said unshaped product.
The combined particles (a) and (b) with a size of greater than 1 mm, preferably the combined panicles of the unshaped product with a size of greater than 1 mm, represent between 0 and 22%, preferably between 0 and 17%, preferably between 0 and 14%, indeed even between 7% and 14%, of the weight of said unshaped product.
The combined particles (a) and (b) with a size of greater than 1.25 mm, preferably the combined particles of the unshaped product with a size of greater than 1.25 mm, represent between 0 and 19%, preferably between 0 and 15%, indeed even between 0 and 12%, indeed even between 0 and 10%, indeed even between 5% and 10%, of the weight of said unshaped product.
The amount of particles (a) in the unshaped product is greater than 82%, preferably greater than 85%, preferably greater than 91% and/or less than 98%, preferably less than 97%.
Preferably, the combined particles (a) comprise, as percentages by weight on the basis of the weight of the unshaped product:
  a content of AZS particles of greater than 10%, of greater than 20% and/or less than 95%; and/or
  a content of reactive alumina of greater than 2%, of greater than 3%, of greater than 4%, and/or of less than 13%, of less than 10%, of less than 8%; and/or
  a content of calcined alumina of greater than 5%, of greater than 10%, and/or of less than 38%, of less than 35%; and/or
  a content of electrofused alumina of greater than 10%, of greater than 20%, of greater than 25%, and/or of less than 70%, of less than 65%; and/or
  particles exhibiting the following chemical analysis, as percentages by weight on the basis of the oxides: $Cr_2O_3+Al_2O_3+ZrO_2+MgO+Fe_2O_3+SiO_2+TiO_2 \geq 90\%$, preferably ≥95%, and $Cr_2O_3+Al_2O_3 \geq 40\%$, indeed even≥50%, indeed even≥60%, indeed even≥70%, indeed even≥80%, indeed even≥90%, indeed even≥95%, and $Cr_2O_3 \geq 9\%$, indeed even≥15%, indeed even≥20%, indeed even≥29%, indeed even≥39%, indeed even≥49%, indeed even≥59%, indeed even≥70%, indeed even≥80%, indeed even≥90%, and $20\% \geq SiO_2 \geq 0.5\%$, and other oxides: ≤10%, preferably ≤5%, the content of said particles being greater than 10%, greater than 20%, greater than 30% and/or less than 95%, and/or
  a content of pigmentary chromium oxide of greater than 5%, of greater than 10%, and/or of less than 25%, of less than 20%.
The hot binder is chosen so as not to be in the solid state at a temperature of 1350° C., preferably of 1300° C., preferably of 1250° C., preferably of 1200° C., preferably of 1150° C.,
The particles (b) represent more than 3% and less than 13%, preferably less than 12%, preferably less than 10%, preferably less than 9%, preferably less than 8%, of the weight of said unshaped product.
The particles (b) of the product are preferably distributed in the following way, as percentages by weight on the basis of the weight of the particles (b):
  fraction≤1 mm: ≥80%, preferably ≥90%, indeed even≥95%, indeed even substantially 100%, and/or
  fraction≤0.5 mm: ≥80%, preferably ≥90%, and/or
  fraction≤0.1 mm: ≥25% and/or ≤48%, preferably ≤45%, and/or
  fraction≤0.04 mm: ≤30%, preferably ≤25%, indeed even≤20%.
The particles (b) preferably exhibit a melting point of greater than 750° C., preferably of greater than 800° C., preferably of greater than 900° C. and/or of less than 1650° C. preferably of less than 1600° C., preferably of less than 1550° C., indeed even of less than 1500° C.
Preferably, the particles (b) consist of a material, the chemical composition of which comprises more than 90%, preferably more than 94%, preferably more than 97%, of oxides. In one embodiment, said material is substantially entirely composed of oxides.
The particles (b) consist of a material, the chemical composition of which comprises more than 45%, preferably more than 50%, preferably more than 55%, and/or less than 80%, preferably less than 75%, of silica, as percentage by weight.
The particles (b) made of a glass-ceramic precursor glass and/or the particles (b) made of glass-ceramic exhibit the following chemical composition, as percentages by weight on the basis of the oxides and for a total of more than 95%, more than 98%, preferably of substantially 100%:
  $SiO_2$: 45%-75%, and
  $Al_2O_3$: 5%-40%, and
  $CaO+MgO+Li_2O$: 3%-30%,
  nucleating agents, expressed in an oxide form: 0.1%-20%.
The amount of nucleating agents is preferably greater than 1% and/or less than 10%, preferably less than 5%.
Preferably, said nucleating agents are chosen from $TiO_2$, $ZrO_2$, $P_2O_5$ and their mixtures.
The amount of particles (c) of hydraulic cement is preferably less than 1%, preferably less than 0.5%. Preferably, the amount of particles (c) of hydraulic cement is substantially zero.

The content of "other constituents" (d) is preferably less than 5%, preferably less than 3%, preferably less than 2%, preferably less than 1%.

Preferably, the "other constituents" (d) consist of oxides.

Preferably, the "other constituents" (d) consist of surface-active agents, of antisegregation adjuvants and optionally of fibers.

The unshaped product comprises a surface-active agent, preferably between 0.075% and 1% of a surface-active agent.

The surface-active agent is a modified polycarboxylate ether.

The unshaped product preferably comprises an antisegregation adjuvant, preferably in an amount of between 0.05% and 0.5% of the weight of the unshaped product.

In one embodiment, the unshaped product comprises fibers, preferably organic fibers, preferably between 0.01% and 0.06%, preferably between 0.01% and 0.03%.

In one embodiment, the unshaped product does not comprise fibers.

The invention also relates to a wet mixture consisting of an unshaped product according to the invention and of water in an amount of less than 13%, of less than 12%, as percentage by weight on the basis of the wet mixture.

Despite a limited amount of water, a wet mixture according to the invention is a self-flow mixture and does not result in segregation. After sintering, it results in a product perfectly suited to the repair of a region of a glass furnace intended to be in contact with molten glass.

The invention also relates to a glass melting furnace comprising at least one region, especially in contact with molten glass, in particular the bottom, obtained from an unshaped product according to the invention.

The invention also relates to a process for repairing a glass melting furnace and in particular a bottom of such a furnace, the process comprising the following stages:

1) independently of stages 2) to 4), preparing an unshaped product according to the invention;
2) emptying of the molten glass present in the furnace;
3) optionally, rinsing of the bottom, in particular of the worn zones, using a product suitable for melting the glass residues;
4) reducing the temperature in the furnace to a temperature at which the hot binder is no longer in the solid state, preferably between 900° C. and 1350° C.;
5) wetting of said unshaped product so as to obtain a wet mixture;
6) installing said wet mixture;
7) maintaining the temperature of the furnace between 1250° C. and 1400° C. in order to make possible the sintering of said wet mixture, preferably for a time of greater than 8 hours, preferably of greater than 10 hours, and preferably of less than 15 hours;
8) introducing a glass composition to be melted and increasing the temperature of the furnace up to its operating temperature.

Definitions

"Unshaped product" refers to a dry or wet particulate mixture capable of setting solid, so as to constitute a shaped product.

"Wet mixture" is understood to mean a mixture of an unshaped product and of a liquid, preferably water.

Particle "made of a material" or "of a material" is understood to mean a particle composed for more than 95%, more than 98%, preferably substantially 100%, of its weight of said material.

A hydraulic cement or "hydraulic binder" is a binder which, during activation, generates hydraulic setting and hardening.

"Refractory material" is understood to mean a material exhibiting a melting point of greater than 1500° C. This definition is commonly employed by a person skilled in the art and is cited in "*Matériaux réfractaires et céramiques tecnmiques (éléments de céramurgie et de technologie* [Engineering refractory and ceramic materials (ceramurgy and technology components])", G. Aliprandi, published by Septima Paris, 1979. This work also gives, on pages 297 to 301, examples of refractory materials, in particular oxides, carbides and nitrides.

The "glass" of the particles (b) is a noncrystalline material exhibiting a glass transition temperature of less than 1100° C.

"Glass transition temperature" of a glass is understood to mean the temperature at which the material changes from the solid state to the viscous state. The glass transition temperature may be determined by differential thermal analysis (DTA). The glass transition temperature is the temperature at which the glass exhibits a viscosity substantially equal to $10^{12}$Pa·s. A glass is conventionally regarded as "in the solid state" at a temperature lower than its glass transition temperature. Likewise, as is well known, a glass-ceramic is regarded as "in the solid state" at a temperature lower than the glass transition temperature of its residual glassy phase.

"Hot binder" is understood to mean a constituent exhibiting a melting point of greater than 600° C. and capable of bonding together, after hardening under the effect of a fall in the temperature, particles (a) with which it has been mixed.

"Glass-ceramic" or "glass-ceramic material" is conventionally understood to mean a microcrystalline compound obtained by controlled crystallization of a "glass-ceramic precursor glass".

The controlled crystallization of a glass-ceramic precursor glass is conventionally carried out during a stage following, immediately or not, the stage of obtaining said glass-ceramic precursor glass.

A glass-ceramic precursor glass is a glass in the solid state which, unlike other glasses, contains "nucleating agents".

A nucleating agent is an agent capable of bringing about the formation of microcrystallizations or "microcrystallites" during the controlled crystallization heat treatment, usually known as "crystallization heat treatment" or "glass-ceramization heat treatment", a microcrystallite being a crystal whose half-sum of the length and the width is less than 10 μm. The length and width of a microcrystallite are conventionally evaluated from sectional views of the glass-ceramic.

The microstructure of a glass-ceramic thus consists of microcrystallites bathed in a residual glassy phase.

The melting point of a glass-ceramic material is the equilibrium temperature separating the domain where liquid and solid phases coexist from the domain where only a liquid phase is present.

The products manufactured by melting-cooling which, during their manufacture, do not transit through a stage in which they are in the glass state are thus not glass-ceramic materials. Fused corundum, fused alumina, fused spinels, fused magnesia, fused mullite, fused mullite-zirconia, fused aluminum titanate, which is optionally doped, and fused nitrides are not, in particular, glass-ceramic materials.

"Degree of crystallization" of a glass-ceramic material is understood to mean the percentage by weight of crystalline phases present in said material.

The degree of crystallization may be measured by X-ray diffraction, for example according to the following method:

The X-ray diffraction diagrams are acquired with a D5000 diffractometer, with copper anticathode, from Bruker. The acquisition is carried out over a 2θ angular range of between 5° and 80°, with a step of 0.02° and a time of 1 s/step. A 0.6 mm receiving slit is used and the sample is in rotation about itself in order to limit the effects of preferred orientations. The acquisition time is increased by a factor of 2 in order to obtain better statistical counting.

The nature of the crystalline phases present is determined with EVA software and the database of ICDD files.

The percentage of amorphous phases is measured with the High Score Plus software supplied by PANalytical. The method uses the Rietveld refinement by adding, to the sample, a known percentage of a standard crystalline standard, in this case zinc oxide ZnO. The sample is a pellet obtained by mixing, in an agate morter, 0.4 g (i.e., 20% by weight) of ZnO particles with a purity of greater than 99% by weight and with a size of less than 1 μm and 1.6 g (i.e., 80% by weight) of glass-ceramic particles ground in order to exhibit a size of less than 40 μm.

The amorphous phases are not visible with the Rietveld method; only the crystalline phases are taken into account and their sum is standardized to 100%.

In the case where at least one amorphous phase is also present, the amount of crystalline phases has to be corrected: The addition of a known amount of the crystalline standard makes it possible to carry out a correction of the amount of all the crystalline phases present and thus makes it possible to determine the percentage of amorphous phases present. % CompAm.

The degree of crystallization is given by the following formula: 100−% CompAm, as percentage by weight.

Calcined, reactive and tabular aluminas are fully known to a person skilled in the art and are commercially available.

Calcined alumina is obtained from bauxite treated according to the Bayer process, followed by a calcination at a temperature typically between 1000 and 1250° C. in order to remove the hydrates and to obtain a mainly crystalline powder in the $\alpha$-$Al_2O_3$ form.

Tabular alumina is a calcined alumina sintered under air at a temperature of greater than 1600° C. and for a sufficiently long time for its shrinkage to no longer increase. The morphology of the crystals of this alumina as elongated hexagonal tablets is the source of its name.

Reactive alumina is conventionally obtained by grinding calcined alumina. Powders of reactive alumina particles conventionally exhibit a median diameter of less than 2 μm, preferably of less than 1 μm.

The 10 ($D_{10}$), 50 ($D_{50}$) and 90 ($D_{90}$) percentiles or "centiles" are the sizes of particles of a powder corresponding to the percentages by weight, of 10%, of 50% and of 90% respectively, on the cumulative particle size distribution curve of the sizes of the particles of the powder, the sizes of the particles being categorized by increasing order. For example, 90% by weight of the particles of the powder have a size of less than $D_{90}$ and 10% of the particles by weight have a size of greater than or equal to $D_{10}$. The percentiles can be determined using a particle size distribution produced using a laser particle sizer. The laser particle sizer used may be a Partica LA-950 from Horiba.

$D_{50}$ corresponds to the "median size" of an assembly of particles, that is to say to the size dividing the particles of this assembly into first and second populations equal by weight, these first and second populations comprising only particles exhibiting a size of greater than or equal to, or respectively less than, the median size.

"Maximum size" refers to the 99.5 ($D_{99.5}$) percentile of an assembly of particles.

It is clear that the particles having a size of less than 10 μm (which constitute the "<10 μm fraction") are included in the 29% to 52% of the particles having a size of less than 40 μm, that the particles having a size of less than 2 μm are included in the particles having a size of less than 40 μm and in those having a size of less than 10 μm, and the like.

"Impurities" is understood to mean the unavoidable constituents, introduced unintentionally and necessarily with the starting materials or resulting from reactions with these constituents. The impurities are not necessary constituents but merely tolerated constituents. Preferably, the amount of the impurities is less than 2%, less than 1%, less than 0.5%, indeed even substantially zero.

The AZS products are products, preferably electrofused products, the main constituents of which are alumina ($Al_2O_3$), zirconia ($ZrO_2$) and silica ($SiO_2$). In other words, alumina, zirconia and silica are the constituents whose contents by weight are the highest. These products are highly suitable for the manufacture of glass furnaces. More particularly, the current AZS products are mainly used for the zones in contact with the molten glass and also for the superstructure of the glass furnaces. The AZS products comprise in particular products sold by Saint-Gobain SEFPRO, such as ER-1681, ER-1685 or ER-1711.

When reference is made to $ZrO_2$ or to zirconia, there is good reason to understand $ZrO_2$ and traces of $HfO_2$. This is because a small amount of $HfO_2$, which cannot be chemically separated from $ZrO_2$ in a melting process and which exhibits similar properties, is always naturally present in zirconia sources at contents generally of less than 2%. Hafnium oxide is then not regarded as an impurity. The content of $HfO_2$ in the AZS particles is preferably less than 5%, less than 3%, less than 2%.

"Fibers" refers to elongated structures, typically with a diameter from 1 μm to 1 mm and with a length ranging up to approximately 60 mm.

All the percentages of the present description are percentages by weight, unless otherwise mentioned.

Detailed Description of the Unshaped Product

General Points

An unshaped product according to the invention may be packaged in bags or in kegs. Preferably, the unshaped product is ready-for-use, that is to say incorporates all the constituents except the water.

Preferably, the combined particles (a) and (b) represent more than 95%, preferably more than 97%, preferably more than 98%, indeed even more than 99%, of the weight of the unshaped product.

Preferably, the unshaped product exhibits a chemical composition such that the sum $Al_2O_3+ZrO_2+SiO_2+Cr_2O_3 \geq 85\%$, preferably $\geq 90\%$, preferably $\geq 92\%$, indeed even greater than 94%, indeed even greater than 95%.

In one embodiment, the unshaped product exhibits a chemical composition such that the sum $Al_2O_3+ZrO_2+SiO_2 \geq 85\%$, preferably $\geq 90\%$, preferably $\geq 92\%$, indeed even greater than 94%, indeed even greater than 95%.

In one embodiment, the unshaped product exhibits the following composition by weight, for a total of more than 95%, preferably for a total of more than 97%:
$Al_2O_3$: 85%-97%, preferably $\geq 90\%$, and/or $\leq 94\%$,
$SiO_2$: $\geq 1\%$, preferably $\geq 2\%$ and/or $\leq 11\%$, preferably $\leq 9\%$, preferably $\leq 7\%$.

In one embodiment the unshaped product exhibits the following composition by weight, for a total of more than 95%, preferably for a total of more than 97%:
$Al_2O_3$: 43%-60%,
$ZrO_2$: 20%-43%,
$SiO_2$: 10%-26%.
Preferably,
$Al_2O_3$: $\geq 45\%$, preferably $\geq 50\%$ and/or $\leq 58\%$, preferably $\leq 55\%$, and/or
$ZrO_2$: $\geq 25\%$ and/or $\leq 35\%$, and/or
$SiO_2$: $\geq 12\%$, preferably $\geq 14\%$, preferably $\geq 15\%$ and/or $\leq 23\%$, preferably $\leq 19\%$.

In one embodiment, the unshaped product exhibits the following composition by weight, for a total of more than 95%, preferably for a total of more than 97%:
$Al_2O_3$: 5%-60%,
$ZrO_2$: $\leq 35\%$.
$SiO_2$: 5%-25%,
$Cr_2O_3$: 10%-90%.
Preferably,
$Al_2O_3$: $\geq 40\%$, preferably $\geq 50\%$ and/or $\leq 60\%$, and/or
$ZrO_2$: $\geq 5\%$, preferably $\geq 10\%$ and/or $\leq 30\%$, indeed even $\leq 20\%$, and/or
$SiO_2$: $\geq 10\%$ and/or $\leq 20\%$, and/or
$Cr_2O_3$: $\geq 15\%$, preferably $\geq 20\%$ and/or $\leq 65\%$, indeed even $\leq 60\%$.

In a preferred embodiment, the combined particles (a) and (b) exhibit a composition, the complement to 100% to the oxides $Al_2O_3$, $SiO_2$, $ZrO_2$ and $Cr_2O_3$ of which consists of CaO and/or $B_2O_3$ and/or $Na_2O$ and/or $P_2O_5$ and/or MgO and/or $K_2O$ and/or BaO and/or SrO and/or ZnO et/ou $Li_2O$ and/or $TiO_2$ (which result conventionally from the presence of a glass) and of impurities. The impurities may, for example, be metal particles.

Preferably, the maximum size of the combined particles (a) and (b), preferably the maximum size of the particles of an unshaped product according to the invention, is less than or equal to 2 mm, indeed even less than or equal to 1.5 mm. Advantageously, the flowability of the wet mixture at high temperature is thereby improved.

Preferably, the combined particles (a) and (b), preferably the combined particles of the unshaped product, are distributed in the following way, as percentages by weight:
fraction<0.5 μm: $\leq 7\%$, preferably $\leq 6\%$, preferably $\leq 5\%$, and/or $\geq 2\%$, and/or
fraction<2 μm: $\geq 5\%$, preferably $\geq 6\%$, preferably $\geq 7\%$ and/or preferably $\leq 18\%$, preferably $\leq 16\%$, preferably $\leq 14\%$, preferably $\leq 12\%$, and/or
fraction<10 μm: $\geq 16\%$, preferably $\geq 19\%$, preferably $\geq 20\%$ and/or preferably $\leq 40\%$, preferably $\leq 35\%$, preferably $\leq 33\%$, preferably $\leq 30\%$, preferably $\leq 28\%$, and/or
fraction<40 μm: $\geq 27\%$, preferably $\geq 29\%$, preferably $\geq 30\%$, preferably $\geq 33\%$, preferably $\geq 35\%$, preferably $\geq 37\%$ and/or preferably $\leq 50\%$, preferably $\leq 47\%$, preferably $\leq 45\%$, preferably $\leq 42\%$, and/or
fraction of between 2 μm and 40 μm: $\geq 16\%$ and/or $\leq 40\%$.

Preferably, the particles of the unshaped product are distributed in the following way:
fraction<0.5 μm: 1%-6%, and
fraction<2 μm: 6%-16%, and
fraction<10 μm: 16%-35%, and
fraction<40 μm: 27%-47%, and
maximum size of the particles: $\leq 2.5$ mm, preferably $\leq 2$ mm.

More preferably, the particles of the unshaped product are distributed in the following way:
fraction<0.5 μm: 1%-5%, and
fraction<2 μm: 7%-12%, and
fraction<10 μm: 19%-28%, and
fraction<40 μm: 29%-45%, and
maximum size of the particles: $\leq 2.5$ mm, preferably $\leq 2$ mm.

Conventional compaction models, such as the Fuller-Bolomey model or the Andreasen model, may be used to determine the most appropriate particle size distribution.

Particles (a)

The particles (a) may exhibit different compositions from one another. In one embodiment, all the particles (a) preferably exhibit the same composition. Preferably, they are homogeneous.

The particles (a) may be formed from one or more sources of starting materials, exhibiting different chemical analyses. The particle size distributions of the particles may also differ according to said sources.

The following sources may in particular be used:
an electrofused refractory product, such as Jargal M, produced and sold by the Société Européenne des Produits Réfractaires, exhibiting the following typical chemical analysis: $Al_2O_3$: 95%, $SiO_2$: 0.5%, $Na_2O$: 4%, others: 0.5%, the size of the Jargal M particles preferably being greater than 50 μm and less than 10 mm;

electrofused refractory products, such as ER-1681 or ER-1711, produced and sold by the Société Européenne des Produits Réfractaires. These two products, referred to in table 1 as "AZS particles" (as a result of their contents of $Al_2O_3$, $ZrO_2$ and $SiO_2$), contain, as percentages by weight, on the basis of the oxides: 32 to 54% of $ZrO_2$, 36 to 51% of $Al_2O_3$, 10 to 16% of $SiO_2$, and 0.2 to 1.5% of $Na_2O$; mullite, fused or sintered, for example a powder which contains 76.5% of $Al_2O_3$ and 22.5% of $SiO_2$ and the particle size of which varies from 0.7 to 1.5 mm;

products containing chromium oxide and exhibiting the following chemical analysis, as percentages by weight on the basis of the oxides:
$Cr_2O_3+Al_2O_3+ZrO_2+MgO+Fe_2O_3+SiO_2+TiO_2 \geq 90\%$, preferably $\geq 95\%$, and $Cr_2O_3+Al_2O_3 \geq 40\%$, indeed even $\geq 50\%$, indeed even $\geq 60\%$, indeed even $\geq 70\%$, indeed even $\geq 80\%$, indeed even $\geq 90\%$, indeed even $\geq 95\%$, and $Cr_2O_3 \geq 9\%$, indeed even $\geq 15\%$, indeed even $\geq 20\%$, indeed even $\geq 29\%$, indeed even $\geq 39\%$, indeed even $\geq 49\%$, indeed even $\geq 59\%$, indeed even≥70%, indeed even≥80%, indeed even≥90%, and 20% 2 SiO$_2$≥0.5%, and other oxides: ≤10%, preferably ≤5%;

products having a high zirconia content, such as CC10 zirconia, sold by the Société Européenne des Produits Réfractaires. This product contains more than 99% of ZrO$_2$ and the median size (D$_{50}$) of the zirconia particles is 3.5 µm;

electrofused alumina, which is provided in the form of a powder, the particles of which have a size preferably of between 10 µm and 10 mm;

tabular alumina, which is provided in the form of a powder, the particles of which have a size preferably of between 10 µm and 10 mm;

calcined alumina, which is provided in the form of a powder, the particles of which have a size preferably of between 1 µm and 50 µm;

pigmentary chromium oxide, containing more than 98.5% of Cr$_2$O$_3$, which is provided in the form of a powder exhibiting a median size≤10 µm, indeed even≤5 µm, indeed even≤1 µm;

reactive alumina, or a mixture of reactive aluminas, containing more than 99% of Al$_2$O$_3$, it being possible for the median size of the reactive alumina particles to preferably vary from 0.5 µm to 3 µm.

Particles (b)

The particles (b) may exhibit different compositions from one another.

In one embodiment, all the particles (b) made of glass-ceramic and/or all the particles (b) made of glass, in particular made of glass-ceramic precursor glass, are formed of the same material.

Preferably, the particles (b) made of a glass exhibit a glass transition temperature of less than 1000° C., preferably of less than 900° C., indeed even of less than 800° C.

An amount of particles (b) of greater than 15% of the weight of the unshaped product produces an excessively great reduction in the resistance to corrosion. An amount of particles (b) of less than 2% of the weight of the unshaped product does not make it possible to bind the particles (a) together in a satisfactory manner after installation of said unshaped product and does not make it possible to obtain a wet mixture which is self-flowable under hot conditions.

In a specific embodiment of the first main embodiment, the combined particles (b) comprise glass particles, preferably consist of glass particles, exhibiting the following chemical composition by weight:

SiO$_2$: 70%-75%,
Al$_2$O$_3$: ≤2%,
CaO: 8%-12%,
Na$_2$O: 11%-14%,
K$_2$O: ≤4%,
MgO: ≤6%,
Others: ≤3%.

The unshaped product is then particularly well suited to being used in a soda-lime glass melting furnace.

In a specific embodiment of the first main embodiment, the combined particles (b) comprise glass particles, preferably consist of glass particles, exhibiting the following chemical composition by weight:

SiO$_2$: 57%-65%,
Al$_2$O$_3$: ≤3%,
CaO: 6%-8%,
Na$_2$O: 14%-18%,
K$_2$O: ≤1%,
MgO: 3%-5%.
B$_2$O$_3$: 5%-12%,
Others: ≤3%.

The unshaped product is then particularly well suited to being used in a furnace for the melting of glass for insulation, indeed even a soda-lime glass melting furnace.

In a specific embodiment of the first main embodiment, the combined particles (b) comprise glass particles, preferably consist of glass particles, exhibiting the following chemical composition by weight:

SiO$_2$: 54%-63%,
Al$_2$O$_3$: 14%-20%,
CaO: 4%-17%,
Na$_2$O: ≤1%.
MgO: ≤5%,
B$_2$O$_3$: 6%-12%,
SrO+BaO+ZnO: 3%-12%.

Le produit non façonné est alors particulièrement bien adapté pour être utilisé dans un four de fusion de verre de renforcement, et dans un four de verre pour l'isolation, voire un four de fusion de verre sodocalcique.

Preferably, more than 50%, preferably more than 70%, preferably more than 90%, preferably more than 95%, preferably substantially 100%, of the glass-ceramic particles (b), as percentages by weight on the basis of the glass-ceramic particles, exhibit a degree of crystallization of greater than 5%, preferably of greater than 10%, indeed even of greater than 15% and preferably of less than 80%, preferably of less than 70%, preferably of less than 60%, preferably of less than 50%.

Preferably, the glass-ceramic particles (b) exhibit wollastonite and/or pseudowollastonite and/or anorthite and/or gehlenite and/or virgilite and/or spodumene and/or indialite and/or cordierite and/or beta-quartz and/or cristobalite and/or tridymite and/or mullite and/or clinoenstatite and/or spinel and/or diopside and/or zirconolite and/or protoenstatite and/or forsterite and/or sapphirine and/or rankinite and/or bredigite and/or alite and/or grossite and/or albite microcrystallites.

Preferably, the particles (b) of glass-ceramic precursor glass exhibit a chemical analysis capable of forming, by crystallization heat treatment, wollastonite and/or pseudowollastonite and/or anorthite and/or gehlenite and/or virgilite and/or spodumene and/or indialite and/or cordierite and/or beta-quartz and/or cristobalite and/or tridymite and/or mullite and/or clinoenstatite and/or spinel and/or diopside and/or zirconolite and/or protoenstatite and/or forsterite and/or sapphirine and/or rankinite and/or bredigite and/or alite and/or grossite and/or albite microcrystallites.

Preferably, the glass-ceramic precursor glass exhibits a glass transition temperature of greater than 700° C., indeed even of greater than 750° C.

In a specific embodiment of the second main embodiment, the combined particles (b) comprise particles made of a glass-ceramic precursor glass, preferably consist of particles made of a glass-ceramic precursor glass, exhibiting the following chemical composition by weight, as percentages by weight on the basis of the oxides and for a total of more than 95%, more than 98%, preferably of substantially 100%:

SiO$_2$: 45%-75%, and
Al$_2$O$_3$: 5%-40%, and
CaO+MgO+Li$_2$O: 3%-30%.
nucleating agents, preferably chosen from TiO$_2$, ZrO$_2$, P$_2$O$_5$ and their mixtures, expressed in an oxide form: 0.1%-20%, preferably 1%-10%, preferably 1%-5%.

In a specific embodiment of the second main embodiment, the combined particles (b) comprise particles made of a glass-ceramic precursor glass, preferably consist of particles made of a glass-ceramic precursor glass, exhibiting a chemical analysis capable of forming, by crystallization heat treatment, wollastonite and/or pseudowollastonite and/or anorthite and/or gehlenite and/or virgilite and/or spodumene and/or indialite and/or cordierite and/or beta-quartz and/or cristobalite and/or tridymite and/or mullite and/or clinoenstatite and/or spinel and/or diopside and/or zirconolite and/or protoenstatite and/or forsterite and/or sapphirine and/or rankinite and/or bredigite and/or alite and/or grossite and/or albite microcrystallites. In a specific embodiment of the second main embodiment, the combined particles (b) comprise glass-ceramic particles, preferably consist of glass-ceramic particles, exhibiting wollastonite and/or pseudowollastonite and/or anorthite and/or gehlenite and/or virgilite and/or spodumene and/or indialite and/or cordierite and/or beta-quartz and/or cristobalite and/or tridymite and/or mullite and/or clinoenstatite and/or spinel and/or diopside and/or zirconolite and/or protoenstatite and/or forsterite and/or sapphirine and/or rankinite and/or bredigite and/or alite and/or grossite and/or albite microcrystallites.

Particles (c)

In a noteworthy manner, an unshaped product according to the invention comprises less than 2% of particles (c) of hydraulic cement. As is shown in the examples described below, the inventors have discovered that, surprisingly, hydraulic cement has a harmful effect when it is combined with the other constituents of an unshaped product according to the invention.

Although the addition of cement is a conventional measure in products intended for the repair of glass furnaces, the content of hydraulic cement has to be, according to the invention, as low as possible.

The hydraulic cement may especially be a high-alumina cement exhibiting in particular an alumina content of greater than 69%.

Other Constituents (d)

The content of "other constituents" is acceptable when it is less than 7%.

The content of "other constituents" is preferably ≤5%, ≤3%, ≤2%, ≤1%.

Preferably, the unshaped product according to the invention comprises a surface-active agent, preferably in a content by weight of 0.1% to 1%, preferably of greater than or equal to 0.2% and/or of less than 0.5%, more preferably of less than 0.4%. The role of this surface-active agent is in particular to modify the rheological properties of the unshaped product in order to facilitate the pumping of it. Use is preferably made of surface-active agents chosen from sodium polyacrylates, ammonium polyacrylates, modified polycarboxylates, long-chain sodium polyphosphates and their mixtures. Preferably, the surface-active agents are chosen from modified polycarboxylates, preferably of modified polycarboxylate ether type, more preferably based on polyethylene glycol.

Preferably, the unshaped product according to the invention also comprises at least one antisegregation adjuvant, preferably in a proportion of 0.05% to 0.3%. The antisegregation adjuvant may in particular be chosen from starch ethers.

The choice of a surfactant and of an antisegregation adjuvant from the surfactants and antisegregation adjuvants generally used by a person skilled in the art is guided by the results of simple tests, such as those described in the present patent application, as a function of the performance features desired.

In one embodiment, the fibers, preferably organic fibers, are, for example, polypropylene, polyacrylonitrile or polyvinyl alcohol fibers.

In one embodiment, the unshaped product comprises more than 0.01% of fibers. Preferably, the mean length (arithmetic mean) of these fibers is greater than 6 mm, preferably between 18 and 24 mm.

However, these fibers are not essential. Preferably, the unshaped product does not comprise fibers.

SPECIFIC EMBODIMENTS

In one embodiment, the unshaped product exhibits a chemical composition such that the sum $Al_2O_3+ZrO_2+SiO_2 \geq 85\%$, preferably ≥90%, preferably ≥92%, indeed even greater than 94%, indeed even greater than 95%.

In one embodiment, the unshaped product exhibits the following composition by weight, for a total of more than 95%, preferably for a total of more than 97%:
  $Al_2O_3$: 85%-97%, preferably ≥90%, and/or ≤94%,
  $SiO_2$: ≥1%, preferably ≥2% and/or ≤10%, preferably ≤9%, preferably ≤7%.

In one embodiment, the unshaped product exhibits the following composition by weight, for a total of more than 95%, preferably for a total of more than 97%:
  $Al_2O_3$: 43%-60%.
  $ZrO_2$: 20%-43%.
  $SiO_2$: 10%-26%.
  Preferably,
  $Al_2O_3$: ≥45%, preferably ≥50% and/or ≤58%, preferably ≤55%, and/or
  $ZrO_2$: ≥25% and/or ≤35%, and/or
  $SiO_2$: ≥12%, preferably ≥14%, preferably ≥15% and/or ≤23%, preferably ≤19%.

In one embodiment, the unshaped product exhibits the following composition by weight, for a total of more than 95%, preferably for a total of more than 97%:
  $Al_2O_3$: 5%-60%,
  $ZrO_2$: ≤35%,
  $SiO_2$: 5%-25%,
  $Cr_2O_3$: 10%-90%.
  Preferably,
  $Al_2O_3$: ≥40%, preferably ≥50% and/or ≤60%, and/or
  $ZrO_2$: ≥5%, preferably ≥10% and/or ≤30%, indeed even≤20%, and/or
  $SiO_2$: ≥10% and/or ≤20%, and/or
  $Cr_2O_3$: ≥15%, preferably ≥20% and/or ≤65%, indeed even≤60%.

In one embodiment, the unshaped product exhibits the following composition by weight, for a total of more than 95%, preferably for a total of more than 97%, preferably for more than 99%:
  $Al_2O_3$: 85%-97%, preferably ≥90%, and/or ≤94%,
  $SiO_2$: ≥1%, preferably ≥2% and/or ≤10%, preferably ≤9%, preferably ≤7%,
and, preferably, the combined particles (a):
  comprise reactive alumina in an amount by weight of greater than 2%, of greater than 4%, of greater than 5%, and/or of less than 13%, of less than 10%, on the basis of the weight of the unshaped product, and/or
  comprise calcined alumina in an amount by weight of greater than 20%, of greater than 25%, and/or of less than 38%, of less than 35%, on the basis of the weight of the unshaped product, and/or
  comprise electrofused alumina in an amount by weight of greater than 50%, of greater than 55%, and/or of less than 70%, of less than 65%, on the basis of the weight of the unshaped product, and, preferably, the combined particles (b) of the unshaped product exhibit the following chemical composition:
- $SiO_2$: 70%-75%,
- $Al_2O_3$: ≤2%,
- CaO: 8%-12%,
- $Na_2O$: 11%-14%,
- $K_2O$: ≤4%,
- MgO: ≤6%,
- Others: ≤3%.

In one embodiment, the unshaped product exhibits the following composition by weight, for a total of more than 95%, preferably for a total of more than 97%, preferably for more than 99%:
- $Al_2O_3$: 43%-60%,
- $ZrO_2$: 20%-43%,
- $SiO_2$: 10%-26%.

Preferably,
- $Al_2O_3$: ≥45%, preferably ≥50% and/or ≤58%, preferably ≤55%, and/or
- $ZrO_2$: ≥25% and/or ≤35%, and/or
- $SiO_2$: ≥12%, preferably ≥14%, preferably ≥15% and/or ≤23%, preferably ≤19%.

and, preferably, the combined particles (a):
- comprise AZS particles in an amount by weight of greater than 80%, preferably of greater than 85%, and/or of less than 95%, on the basis of the weight of the unshaped product, and/or
- comprise reactive alumina in an amount by weight of greater than 3%, of greater than 5%, and/or of less than 10%, of less than 8%, on the basis of the weight of the unshaped product, and, preferably, the combined particles (b) exhibit the following chemical composition:
- $SiO_2$: 70%-75%,
- $Al_2O_3$: ≤2%,
- CaO: 8%-12%,
- $Na_2O$: 11%-14%,
- $K_2O$: ≤4%,
- MgO: ≤6%,
- Others: ≤3%.

In one embodiment, the unshaped product exhibits the following composition by weight, for a total of more than 95%, preferably for a total of more than 97%, preferably for more than 99%:
- $Al_2O_3$: 5%-60%,
- $ZrO_2$: ≤35%,
- $SiO_2$: 5%-25%,
- $Cr_2O_3$: 10%-90%.

Preferably,
- $Al_2O_3$: ≥40%, preferably ≥50% and/or ≤60%, and/or
- $ZrO_2$: ≥5%, preferably ≥10% and/or ≤30%, indeed even≤20%, and/or
- $SiO_2$: ≥10% and/or ≤20%, and/or
- $Cr_2O_3$: ≥15%, preferably ≥20% and/or ≤65%, indeed even≤60%, and, preferably, the combined particles (a) of the unshaped product:
- comprise particles exhibiting the following chemical analysis, as percentages by weight on the basis of the oxides: $Cr_2O_3+Al_2O_3+ZrO_2+MgO+Fe_2O_3+SiO_2+TiO_2$≥90%, preferably ≥95%, and $Cr_2O_3+Al_2O_3$≥40%, indeed even≥50%, indeed even≥60%, indeed even≥70%, indeed even≥80%, indeed even≥90%, indeed even≥95%, and $Cr_2O_3$≥9%, indeed even≥15%, indeed even≥20%, indeed even≥29%, indeed even≥39%, indeed even≥49%, indeed even≥59%, indeed even≥70%, indeed even≥80%, indeed even≥90%, and 20%≥$SiO_2$≥0.5%, and other oxides: ≤10%, preferably ≤5%, in an amount by weight of greater than 10%, of greater than 20%, of greater than 30% and/or of less than 95%, on the basis of the weight of the unshaped product, and/or
- comprise reactive alumina in an amount by weight of greater than 2%, of greater than 3%, of greater than 4%, and/or of less than 13%, of less than 10%, of less than 8%, on the basis of the weight of the unshaped product, and/or
- comprise calcined alumina in an amount by weight of greater than 5%, of greater than 10%, and/or of less than 38%, of less than 35%, of less than 30%, of less than 25%, of less than 20%, on the basis of the weight of the unshaped product, and/or
- comprise electrofused alumina in an amount by weight of greater than 10%, of greater than 20%, of greater than 25%, and/or of less than 50%, of less than 40%, on the basis of the weight of the unshaped product, and/or
- comprise AZS particles in an amount by weight of greater than 10%, of greater than 20% and/or of less than 50%, of less than 40%, on the basis of the weight of the unshaped product, and/or
- comprise pigmentary chromium oxide particles in an amount by weight of greater than 5%, of greater than 10%, and/or of less than 25%, of less than 20%, on the basis of the weight of the unshaped product, and, preferably, the combined particles (b) exhibit the following chemical composition:
- $SiO_2$: 57%-65%,
- $Al_2O_3$: ≤3%,
- CaO: 6%-8%,
- $Na_2O$: 14%-18%,
- $K_2O$: ≤1%,
- MgO: 3%-5%,
- $B_2O_3$: 5%-12%,
- Others: ≤3%.

In one embodiment, the unshaped product exhibits the following composition by weight, for a total of more than 95%, preferably for a total of more than 97%, preferably for more than 99%:
- $Al_2O_3$: 85%-97%, preferably ≥90%, and/or ≤94%,
- $SiO_2$: ≥1%, preferably ≥2% and/or ≤10%, preferably ≤9%, preferably ≤7%, and, preferably, the combined particles (a):
- comprise reactive alumina in an amount by weight of greater than 2%, of greater than 4%, of greater than 5%, and/or of less than 13%, of less than 10%, on the basis of the weight of the unshaped product, and/or
- comprise calcined alumina in an amount by weight of greater than 20%, of greater than 25%, and/or of less than 38%, of less than 35%, on the basis of the weight of the unshaped product, and/or
- comprise electrofused alumina in an amount by weight of greater than 50%, of greater than 55%, and/or of less than 70%, of less than 65%, on the basis of the weight of the unshaped product, and preferably the combined particles (b) of the unshaped product exhibit the following chemical composition, as percentages by weight on the basis of the oxides and for a total of more than 95%, more than 98%, preferably of substantially 100%:
- $SiO_2$: 45%-75%, and
- $Al_2O_3$: 5%-40%, and
- $CaO+MgO+Li_2O$: 3%-30%, nucleating agents, preferably chosen from $TiO_2$, $ZrO_2$, $P_2O_5$ and their mixtures, expressed in an oxide form: 0.1%-20%, preferably 1%-10%, preferably 1%-5%.

In one embodiment, the unshaped product exhibits the following composition by weight, for a total of more than 95%, preferably for a total of more than 97%, preferably for more than 99%:
$Al_2O_3$: 43%-60%,
$ZrO_2$: 20%-43%,
$SiO_2$: 10%-26%.
Preferably,
$Al_2O_3$: ≥45%, preferably ≥50% and/or ≤58%, preferably ≤55%, and/or
$ZrO_2$: ≥25% and/or ≤35%, and/or
$SiO_2$: ≥12%, preferably ≥14%, preferably ≥15% and/or ≤23%, preferably ≤19%,
and, preferably, the combined particles (a):
comprise AZS particles in an amount by weight of greater than 80%, preferably of greater than 85%, and/or of less than 95%, on the basis of the weight of the unshaped product, and/or
comprise reactive alumina in an amount by weight of greater than 3%, of greater than 5%, and/or of less than 10%, of less than 8%, on the basis of the weight of the unshaped product,
and preferably the combined particles (b) exhibit the following chemical composition, as percentages by weight on the basis of the oxides and for a total of more than 95%, more than 98%, preferably of substantially 100%:
$SiO_2$: 45%-75%, and
$Al_2O_3$: 5%-40%, and
$CaO+MgO+Li_2O$: 3%-30%.
nucleating agents, preferably chosen from $TiO_2$, $ZrO_2$, $P_2O_5$ and their mixtures, expressed in an oxide form: 0.1%-20%, preferably 1%-10%, preferably 1%-5%.

In one embodiment, the unshaped product exhibits the following composition by weight, for a total of more than 95%, preferably for a total of more than 97%, preferably for more than 99%:
$Al_2O_3$: 5%-60%.
$ZrO_2$: ≤35%,
$SiO_2$: 5%-25%,
$Cr_2O_3$: 10%-90%.
Preferably,
$Al_2O_3$: ≥40%, preferably ≥50% and/or ≤60%, and/or
$ZrO_2$: ≥5%, preferably ≥10% and/or ≤30%, indeed even≤20%, and/or
$SiO_2$: ≥10% and/or ≤20%, and/or
$Cr_2O_3$: ≥15%, preferably ≥20% and/or ≤65%, indeed even≤60%,
and, preferably, the combined particles (a) of the unshaped product:
comprise particles exhibiting the following chemical analysis, as percentages by weight on the basis of the oxides: $Cr_2O_3+Al_2O_3+ZrO_2+MgO+Fe_2O_3+SiO_2+TiO_2$≥90%, preferably ≥95%, and $Cr_2O_3+Al_2O_3$≥40%, indeed even≥50%, indeed even≥60%, indeed even≥70%, indeed even≥80%, indeed even≥90%, indeed even≥95%, and $Cr_2O_3$≥9%, indeed even≥15%, indeed even≥20%, indeed even≥29%, indeed even≥39%, indeed even≥49%, indeed even≥59%, indeed even≥70%, indeed even≥80%, indeed even≥90%, and 20%≥$SiO_2$≥0.5%, and other oxides: ≤10%, preferably ≤5%, in an amount by weight of greater than 10%, of greater than 20%, of greater than 30% and/or of less than 95%, on the basis of the weight of the unshaped product, and/or comprise reactive alumina in an amount by weight of greater than 2%, of greater than 3%, of greater than 4%, and/or of less than 13%, of less than 10%, of less than 8%, on the basis of the weight of the unshaped product, and/or comprise calcined alumina in an amount by weight of greater than 5%, of greater than 10%, and/or of less than 38%, of less than 35%, of less than 30%, of less than 25%, of less than 20%, on the basis of the weight of the unshaped product, and/or comprise electrofused alumina in an amount by weight of greater than 10%, of greater than 20%, of greater than 25%, and/or of less than 50%, of less than 40%, on the basis of the weight of the unshaped product, and/or comprise AZS particles in an amount by weight of greater than 10%, of greater than 20% and/or of less than 50%, of less than 40%, on the basis of the weight of the unshaped product, and/or comprise pigmentary chromium oxide particles in an amount by weight of greater than 5%, of greater than 10%, and/or of less than 25%, of less than 20%, on the basis of the weight of the unshaped product, and preferably the combined particles (b) exhibit the following chemical composition, as percentages by weight on the basis of the oxides and for a total of more than 95%, more than 98%, preferably of substantially 100%:
$SiO_2$: 45%-75%, and
$Al_2O_3$: 5%-40%, and
$CaO+MgO+Li_2O$: 3%-30%,
nucleating agents, preferably chosen from $TiO_2$, $ZrO_2$, $P_2O_5$ and their mixtures, expressed in an oxide form: 0.1%-20%, preferably 1%-10%, preferably 1%-5%.

Detailed Description of the Repair Process

A repair process according to the invention comprises the stages 1) to 8) described above.

Preferably, in stage 1), the different starting materials are mixed in a kneader. The optional surface-active agent may be mixed at this stage or introduced in stage 5).

Preferably, in stage 1), the chemical composition of the particles (b) is chosen so that their melting point is lower than the temperature of the region to be repaired. In one embodiment, the particles (b) exhibit substantially the same composition as the molten glass in the furnace to be repaired.

Preferably, in stage 2), the emptying of the molten glass is carried out at a temperature close to the melting point of the glass. Said emptying can be carried out, for example, through holes made in the bottom, or through holes created by the dismantling of one or more electrodes present.

In the optional stage 3), the rinsing of the bottom, in particular of the worn zones, is preferably carried out by spraying a product suitable for melting the glass residues. Preferably, said product is chosen from sodium sulfate, sodium carbonate, sodium hydroxide and their mixtures. The products make it possible to increase the fluidity of the glass, which makes it easier to discharge it out of the furnace. Preferably, the repair process according to the invention comprises a stage 3).

In stage 4), the temperature in the furnace is reduced to a temperature at which the hot binder is not in the solid state. In other words, the temperature in the furnace is reduced to a temperature which remains greater than the glass transition temperature of the glassy phase of the hot binder.

The glass transition temperature of the glassy phase of the hot binder depends on the nature of the hot binder. The hot binder is preferably chosen in order for the glass transition temperature of its glassy phase to be between 900° C. and 1350° C., preferably between 1000° C. and 1300° C., preferably between 1150° C. and 1250° C.

In stage 5), the unshaped product is wetted, so as to obtain a wet mixture, by adding thereto an amount of water preferably of greater than 8%, preferably of greater than 9%, and/or of less than 13%, of less than 12%, by weight, with respect to the weight of said unshaped product.

In stage 6), the wet mixture is preferably pumped by means of a pump producing a suction pressure of less than or equal to 180 bar and transported into the furnace, preferably by means of a water-cooled blowpipe. The wet mixture is poured into the furnace, over the existing bottom, the holes produced for the emptying of the glass in stage 2) being filled in again beforehand. Said pouring may be carried out so as to produce repairs in different zones of said bottom. The wet mixture is preferably poured over the entire surface of the bottom of the furnace.

In stage 7), the furnace is maintained at a temperature of between 1250° C. and 1400° C., preferably between 1300° C. and 1400° C., in order to make possible the sintering of said wet mixture, preferably for a time of greater than 8 hours, preferably of greater than 10 hours, and preferably of less than 15 hours.

Preferably, when the unshaped product contains particles (b) of glass-ceramic precursor glass, the furnace is maintained at a temperature which makes it possible to promote the nucleation and the growth of the microcrystallites. A person skilled in the art knows how to determine the range of temperatures which makes possible this nucleation and this growth.

The unshaped product according to the invention advantageously allows a low the sintering temperature and/or a reduced time of maintenance at said temperature. During this stage, it is possible to bore the bottom in order to install electrodes.

In stage 8), the composition of glass to be melted is introduced into the furnace and the temperature of the latter is increased up to its operating temperature.

EXAMPLES

The nonlimiting examples which will follow are given for the purpose of illustrating the invention.

The "self-flowable" nature under hot conditions, the segregation and the appearance after the temperature has gone down again are evaluated by the following test:

A flat-bottomed refractory pot exhibiting an internal diameter equal to 170 mm and an internal height equal to 45 mm is fitted into a metal tank exhibiting a diameter equal to 400 mm. The space between the wall of the tank and the wall of the pot is filled in with insulating materials.

A removable lid made of refractory concrete with a thickness equal to 100 mm is suspended above the pot at a height of between 20 mm and 30 mm. This lid exhibits a hole with a diameter of 100 mm at its center which makes it possible to allow the passage of the flame of a gas burner positioned above said lid and to introduce the wet mixture.

The gas burner is ignited and the inside of the refractory pot is brought to 1300° C., at a rate of temperature rise of 500° C./h.

The tank+pot combination is then rotated at a speed of 6 revolutions per minute.

5 kg of wet mixture are prepared in a kneader having a rotary blade and stationary tank, with a kneading time of 5 minutes.

The wet mixture is subsequently tipped into a metal valley exhibiting a length of 600 mm and edges with a height of 40 mm. Said valley exhibits a slope of 45° and one of its ends is resting on the edge of the central hole of the lid, in order to make possible the introduction under hot conditions of the wet mixture into the pot. The maximum drop height, at the start of the tipping, is approximately 175 mm. Feeding with wet mixture is halted when the latter reaches the top of the refractory pot.

For the tests in which the particles (b) are glass particles, the temperature is subsequently brought to 1450° C. with a rate of temperature rise equal to 100° C./h, and is maintained for a time equal to 10 hours in order to make possible the sintering of the wet mixture.

For the tests in which the particles (b) are particles made of glass-ceramic precursor, the temperature is subsequently brought to 1350° C. with a rate of temperature rise equal to 50° C./h, and is maintained for a time equal to 10 hours in order to make possible the sintering of the wet mixture and the growth of the microcrystallites.

The temperature is brought down gradually at a rate equal to 100° C./h and the slug of sintered product is subsequently removed from the mold.

The appearance of the slug is subsequently observed.

The self-flowable nature under hot conditions is acquired if the slug of sintered product exhibits a diameter substantially equal to the internal diameter of the refractory pot and if the slug does not exhibit, to the naked eye, a hole or a recess at its center.

The slug is subsequently sawn, so as to look for segregation. It is considered that there is segregation when the sawn faces reveal a surface laitance layer extending, from the upper face of the slug, over a depth of 3 mm or more.

The cold compressive strength is measured using an LR150K press sold by Ametek-Lloyd, on cylinders with a diameter equal to 30 mm and with a height equal to 30 mm withdrawn from the slug.

The compositions of the particulate mixtures (a)+(b)+(c) are provided in table 1. The particle size distributions of the electrofused alumina particles and of the AZS particles used are also shown in table 1.

The calcined alumina used is the HVA FG alumina sold by Almatis.

The silica fume is a silica fume comprising more than 90% of silica by weight, which is provided in the form of a powder whose particles have a size of between 0.1 and 5 μm and a median size of less than 0.6 μm, sold by the Société Européenne des Produits Réfractaires.

The cement used is CA25R cement sold by Almatis.

The particles (b) made of glass are made of a soda-lime glass exhibiting the following chemical analysis:
$SiO_2$: 72.3%,
$Al_2O_3$: 0.5%,
CaO: 9.5%,
$Na_2O$: 13.4%,
MgO: 4%,
Others: 0.3%.

The glass transition temperature of this glass is equal to 580° C. The glass transition temperature is determined by differential thermal analysis (DTA) on an STA409C device sold by Netzsch. The sample holders are each equipped with a thermocouple making possible a direct measurement of the temperature of the glass positioned in a dense sintered alumina crucible having a capacity equal to 300 μl and with an identical empty crucible regarded as reference. The glass to be analyzed is ground so as to pass through a sieve with an opening equal to 160 μm. The heat cycle applied during the measurement consists of a rise at a rate equal to 10° C./min, under air, up to 1650° C.

On the thermogram obtained, the glass transition appears as the first endothermic event. The glass transition temperature is equal to the temperature of the point of inflection of the curve in said first endothermic event (i.e., "Tinfl" in the program used).

After grinding, the glass particles exhibit the following particle size distribution:
fraction<0.5 μm: 0%, and
fraction<2 μm: 0%, and
fraction<10 μm: 5%, and
fraction<40 μm: 16%, and
fraction<100 μm: 35%, and
fraction<200 μm: 58%, and
maximum size of the particles: 1 mm.

The particles (b) made of a glass-ceramic precursor glass are prepared in the following way:

A starting charge consisting, as percentages by weight, of 60.4% of silica powder with a purity equal to 98%, 23.4% of an alumina powder with a purity greater than 98%, 12.8% of a lithium carbonate powder, 1.6% of a titanium oxide powder and 1.8% of a zirconia powder is melted in a pot placed in an electric furnace. The pot is subsequently taken out under hot conditions and its contents are poured into a water trough, making possible rapid tempering and preventing crystallization. This results in a powder of particles of glass-ceramic precursor glass. The amorphous state of these particles is confirmed by X-ray diffraction. These particles are subsequently dried at 110° C. for 48 hours.

After drying, the particles of glass-ceramic precursor glass are ground in a jaw crusher and sieved so as to obtain combined particles (b) exhibiting the following particle size distribution:
fraction<0.5 μm: 0%, and
fraction<2 μm: 1%, and
fraction<10 μm: 7%, and
fraction<40 μm: 15%, and
fraction<200 μm: 62%, and
maximum size of the particles: 1 mm.

The particles (b) of glass-ceramic precursor glass obtained exhibit the following chemical composition, as percentages by weight:
$SiO_2$: 64.2%
$Al_2O_3$: 24.8%
$LiO_2$: 5.5%
$TiO_2$: 1.7%
$ZrO_2$: 1.9%
others: 1.9%.

The glass transition temperature of this glass-ceramic precursor glass is less than 1100° C. This composition makes it possible for the precursor glass to form $ZrTiO_4$, beta-quartz and beta-spodumene microcrystallites during the sintering of the unshaped product Said sintering is thus a crystallization heat treatment of the glass-ceramic precursor glass.

Comparative example 1, "Comp 1", is the ramming material described in EP 0 739 861 B1, used in particular in the repair of glass melting furnaces.

Comparative example 2, "Comp 2", is a self-leveling concrete according to WO2013132442, to which glass particles (b) have been added, the particles (b) representing 5% of the total weight of the self-leveling concrete and of the added glass.

The chemical compositions of the wet unshaped products tested, and also the results of the tests carried out, are provided in table 2.

The examples "Comp 2" and 1 to 5 incorporate, as particles (d), 0.2% of a surface-active agent of the family of the modified polycarboxylate ethers and 0.2% of an anti-segregation adjuvant of the family of the starch ethers.

In table 2:
for the "Comp 1" example, the remainder to 100% of $Al_2O_3+SiO_2+ZrO_2$ consists of $P_2O_5$ and impurities.
for the "Comp 2" example, the remainder to 100% of $Al_2O_3+SiO_2+ZrO_2+$ surface-active agent+antisegregation adjuvant consists of CaO contributed by the hydraulic cement and the glass, and also of $Na_2O$, of $K_2O$ and of MgO contributed by the glass, and of impurities,
for examples 1 to 4, the remainder to 100% of $Al_2O_3+SiO_2+ZrO_2+$ surface-active agent+antisegregation adjuvant consists of CaO, of $Na_2O$, of $K_2O$ and of MgO contributed by the glass, and also of impurities, and
for example 5, the remainder to 100% of $Al_2O_3+SiO_2+ZrO_2+$surface-active agent+antisegregation adjuvant consists of $Li_2O$ and of $TiO_2$ contributed by the glass, and also of impurities.

The addition of water (g) is provided as percentage by weight on the basis of the unshaped product.

The particle size distributions, measured using a Horiba laser particle sizer, are also provided in table 2.—

TABLE 1

| | Particulate mixture (a) + (b) + (c), as percentages by weight | | | | | | | | | |
|---|---|---|---|---|---|---|---|---|---|---|
| Ex. No. | Electrofused alumina 0.5 mm-3.5 mm | Electrofused alumina 10 μm-200 μm | Calcined alumina | Reactive alumina | Silica fume | Hydraulic cement | AZS particles 0.5 mm-2 mm | AZS particles 40 μm-500 μm | AZS particles < 40 μm | Glass powder | Powder of glass-ceramic precursor glass |
| Comp 1 | — | — | — | — | — | — | — | — | — | — | — |
| Comp 2 | 44.7 | 14.2 | 16.1 | 12.35 | 2.85 | 4.8 | 0 | 0 | 0 | 5 | 0 |
| 1 | 0 | 0 | 0 | 5 | 0 | 0 | 27 | 31 | 34 | 3 | 0 |
| 2 | 0 | 0 | 0 | 6 | 0 | 0 | 27 | 31 | 31 | 5 | 0 |
| 3 | 0 | 0 | 0 | 3 | 0 | 0 | 27 | 31 | 31 | 8 | 0 |
| 4 | 0 | 0 | 0 | 6 | 0 | 0 | 34 | 38 | 17 | 5 | 0 |
| 5 | 0 | 0 | 0 | 3 | 0 | 0 | 27 | 31 | 31 | 0 | 5 |

TABLE 2

| No. | Dry unshaped product (percentages by weight) | | | Addition Water (%) | Distribution of the particles (a) + (b) + (c) (percentages by weight) | | | | | | Self-flowable | | Appearance after the temperature | Cold compressive strength (MPa) |
| --- | --- | --- | --- | --- | --- | --- | --- | --- | --- | --- | --- | --- | --- | --- |
| | $Al_2O_3$ | $SiO_2$ | $ZrO_2$ | | <0.5 μm | <2 μm | <10 μm | <40 μm | <500 μm | >1 mm | Maximum size (mm) | under hot conditions | Segregation? | has gone down again |
| Comp 1 | 57.2 | 12.5 | 25.1 | 5 | 10.1 | 11.7 | 37.1 | 53.9 | 80.3 | 8 | 2 | no | no | porous | 45 |
| Comp 2 | 91 | 6.3 | 0.1 | 11 | 7 | 11.7 | 30.2 | 38.2 | 55.5 | 32.8 | 3.5 | yes | no | highly cracked and very low mechanical strength | n.d. |
| 1 | 52.4 | 15.8 | 29.7 | 11 | 2.5 | 9.5 | 24.6 | 41.5 | 76.2 | 11.9 | 2 | yes | no | good | 70 |
| 2 | 51.8 | 16.8 | 28.7 | 11 | 2.4 | 8.9 | 22.9 | 39 | 76.1 | 11.9 | 2 | yes | no | good | 65 |
| 3 | 48.9 | 18.9 | 28.7 | 11 | 1.8 | 7.7 | 21.3 | 37.8 | 75.8 | 11.9 | 2 | yes | no | good | 60 |
| 4 | 51.8 | 16.8 | 28.7 | 11 | 2.3 | 6.9 | 16.4 | 28.6 | 69.8 | 15.1 | 2 | yes | no | good | n.d. |
| 5 | 53.1 | 16.4 | 28.8 | 11 | 3 | 9.3 | 23.5 | 39.2 | 76.5 | 12 | 2 | yes | no | good | 80 | n.d.—not determined

The results make it possible to make the following observations:

The "Comp 1" example, which does not comprise particles (b), does not exhibit a self-flowable nature under hot conditions.

The "Comp 2" example exhibits a self-flowable nature but, after the temperature has gone down again, the slug is highly cracked and exhibits a very low mechanical strength: some zones can be broken by hand. Without being committed to any one theory, the inventors attribute this phenomenon to the presence of 4.8% of hydraulic cement in the product of the "Comp 2" example.

The "Comp 1" example exhibits a lower cold compressive strength than that of the unshaped products of the examples according to the invention. The "Comp 1" example requires a sintering temperature of greater than 1350° C. to develop a cold compressive strength similar to that of the products according to the invention: the reintroduction of the composition of glass to be melted of stage 8) may thus be carried out more rapidly with the products according to the invention. The return to production is thus faster than for the product of the "Comp 1" example.

The unshaped products of examples 1, 2 and 5 are the preferred examples.

As is now clearly apparent, the invention provides an unshaped product which makes it possible to manufacture a wet self-flow mixture, which does not result in segregation and which exhibits, after sintering, a good mechanical strength in cold compression, even after sintering at 1350° C. Furthermore, this unshaped product, after wetting, may be pumped with suction pressures of less than or equal to 180 bar.

Finally, other tests have shown that an unshaped product according to the invention, after sintering, generates only a few or no defects when it is in contact with molten glass.

An unshaped product according to the invention is thus perfectly capable of being used for the repair of a glass melting furnace, in particular for a repair of a bottom of such a furnace.

Of course, the present invention is not limited to the embodiments described, which are provided by way of illustrative and nonlimiting examples.

The invention claimed is:

1. A wet mixture consisting of:
   an unshaped product comprising, as percentages by weight and for a total of 100%,
   A) a set of particles (a) of at least one refractory material other than a glass and a glass-ceramic, and the main constituent(s) of which are alumina ($Al_2O_3$) and/or zirconia ($ZrO_2$) and/or silica ($SiO_2$) and/or chromium oxide ($Cr_2O_3$),
   B) a set of particles (b) of a hot binder chosen from glass-ceramic particles, particles made of a glass and the mixtures of these particles: 2% to 15%, said glass being a noncrystalline material exhibiting a glass transition temperature of less than 800° C., the hot binder not being in the solid state at 1500° C.,
   C) a set of particles (c) of hydraulic cement: less than 2%,
   D) less than 7% of constituents other than particles (a), (b), and (c), said particles (a) and (b) being distributed, as percentages by weight with respect to the weight of the unshaped product, in the following way:
   fraction<0.5 μm: ≥1%,
   fraction<2 μm: ≥4%,
   fraction<10 μm: ≥13%,
   fraction<40 μm: 25%-52%,
   the content of the set of particles (a) being the complement, to reach 100%, to the whole content of the particles (b), of the set of particles (c) and of said other constituents, and
   water in an amount of greater than 9%, by weight, with respect to the weight of said unshaped product.

2. The wet mixture as claimed in claim 1, wherein the amount by weight of glass-ceramic particles in the set of particles (b) is greater than 10%, on the basis of the weight of the set of particles (b), and/or, wherein said set of particles (b) comprises particles made of said glass which are particles of a glass-ceramic precursor glass, and the amount by weight of said particles of glass-ceramic precursor glass in the set of particles (b) is greater than 10%, on the basis of the weight of the set of particles (b).

3. The wet mixture as claimed in claim 1, in which the amount by weight of glass-ceramic particles in the set of particles (b) is greater than 95%, on the basis of the weight of the set of particles (b), and/or in which said set of particles (b) comprises particles made of said glass which are particles of a glass-ceramic precursor glass, and the amount by weight of said particles of glass-ceramic precursor glass in the set of particles (b) is greater than 95%, on the basis of the weight of the set of particles (b).

4. The wet mixture as claimed in claim 1, in which the amount of hydraulic cement is less than or equal to 1%.

5. The wet mixture as claimed in claim 4, in which the amount of hydraulic cement is substantially zero.

6. The wet mixture as claimed in claim 1, in which the particles of the unshaped product are distributed in the following way, as percentages by weight:
fraction<0.5 m: ≤7% and/or
fraction<2 μm: ≥5% and/or
fraction<10 μm: ≥16% and/or
fraction<40 μm: ≥27% and/or
fraction of between 2 μm and 40 μm: ≥16% and/or ≤40%.

7. The wet mixture as claimed in claim 1, in which the particles of the unshaped product are distributed in the following way, as percentages by weight:
fraction<0.5 μm: ≤6% and/or
fraction<2 μm: ≤18% and/or
fraction<10 μm: ≤40% and/or
fraction<40 μm: ≥29%.

8. The wet mixture as claimed in claim 1, in which the particles of the unshaped product are distributed in the following way, as percentages by weight:
fraction<2 μm: ≤14% and/or
fraction<10 μm: ≤35% and/or
fraction<40 μm: ≤50%.

9. The wet mixture as claimed in claim 1, in which the particles of the unshaped product are distributed in the following way, as percentages by weight:
fraction<2 μm: ≤12% and/or
fraction<10 μm: ≤30% and/or
fraction<40 μm: ≤42%.

10. The wet mixture as claimed in claim 1, in which the maximum size of the particles of the unshaped product is less than or equal to 2.5 mm.

11. The wet mixture as claimed in claim 1, in which the maximum size of the particles of the unshaped product is less than or equal to 2 mm.

12. The wet mixture as claimed in claim 1, in which the amount of particles (a) is greater than 82% and/or less than 98% of the weight of the unshaped product.

13. The wet mixture as claimed in claim 1, in which the amount of particles (b) is greater than 2% and less than 13% of the weight of the unshaped product.

14. The wet mixture as claimed in the claim 13, in which the amount of particles (b) is greater than 3% and less than 12% of the weight of the unshaped product.

15. The wet mixture as claimed in claim 1, in which the particles (b) exhibit a melting point of greater than 750° C. and of less than 1650° C.

16. The wet mixture as claimed in claim 1, in which the particles (b) consist of a glass having a chemical composition, said chemical composition comprising, as percentage by weight, more than 90% of oxides.

17. The wet mixture as claimed in claim 1, in which the particles (b) consist of a glass having a chemical composition, said chemical composition comprising, as percentage by weight, more than 45% and less than 80% of silica.

18. The wet mixture as claimed in claim 1, in which the particles (b) made of a glass-ceramic precursor glass and/or the particles (b) made of glass-ceramic exhibit the following chemical composition, as percentages by weight on the basis of the oxides and for a total of more than 95%:
$SiO_2$: 45-75%, and
$Al_2O_3$: 5-40%, and
$CaO+MgO+Li_2O$: 3-30%,
nucleating agents, expressed in an oxide form: 0.1-20%.

19. The wet mixture as claimed in claim 18, in which the amount by weight of the nucleating agents is greater than 1% and less than 10%.

20. The wet mixture as claimed in claim 18, in which said nucleating agents are chosen from $TiO_2$, $ZrO_2$, $P_2O_5$ and their mixtures.

21. The wet mixture as claimed in claim 1, in which the particles (b) are distributed in the following way, as percentages by weight on the basis of the particles (b):
fraction<1 mm: ≥80%, and/or
fraction<0.5 mm: ≥80%, and/or
fraction<0.1 mm: ≥25% and/or
fraction<0.04 mm: ≤30%.

22. The wet mixture as claimed in claim 1, in which the unshaped product exhibits a chemical composition such that, in percentages by weight, the sum $Al_2O_3+ZrO_2+SiO_2+Cr_2O_3 \geq 85\%$.

23. The wet mixture as claimed in the claim 22, in which the unshaped product exhibits a chemical composition such that, in percentages by weight, the sum $Al_2O_3+ZrO_2+SiO_2 \geq 85\%$.

24. The wet mixture as claimed in claim 1, in which the unshaped product exhibits a following composition, in percentages by weight, for a total of more than 95%:
$Al_2O_3$: 85%-97%,
$SiO_2$: ≥1% and ≤11%.

25. The wet mixture as claimed in claim 1, in which the unshaped product exhibits a composition, in percentages by weight such that:
$Al_2O_3$: 43%-60%,
$ZrO_2$: 20%-43%,
$SiO_2$: 10%-26%.

26. The wet mixture as claimed in claim 1, in which the unshaped product exhibits a composition, in percentages by weight such that:
$Al_2O_3$: 5%-60%,
$ZrO^2$: ≤35%,
$SiO_2$: 5%-25%,
$Cr_2O_3$: 10%-90%.

27. The wet mixture as claimed in claim 1, in which the unshaped product comprises a surface-active agent in an amount of between 0.075% and 1% of the weight of said unshaped product.

28. The wet mixture as claimed in claim 1, in which the fraction of the particles with a size of less than 500 μm represents more than 50% of the weight of said unshaped product.

29. The wet mixture as claimed in claim 1, in which the fraction of the particles with a size of greater than 1 mm is between 0 and 22% of the weight of said unshaped product.

30. A glass melting furnace comprising at least one part, especially in contact with molten glass obtained from a wet mixture as claimed in claim 1.

31. A wet mixture according to claim 1, in which the amount of water is less than 13%, by weight, with respect to the weight of said unshaped product.

32. A wet mixture according to claim 1, in which the unshaped product comprises at least one antisegregation adjuvant.

33. A wet mixture according to claim 1, in which the amount of water is less than 13%, by weight, with respect to the weight of said unshaped product, and in which the unshaped product comprises an antisegregation adjuvant in an amount of between 0.05% and 0.5% of the weight of the unshaped product.

* * * * *